United States Patent [19]
Gloviak et al.

[11] 4,307,291
[45] Dec. 22, 1981

[54] RESETTABLE MILEAGE COUNTING MECHANISM

[75] Inventors: John A. Gloviak, Chicago; Tom G. Sprandel, Park Ridge, both of Ill.

[73] Assignee: Stewart-Warner Corporation, Chicago, Ill.

[21] Appl. No.: 117,222

[22] Filed: Jan. 28, 1980

[51] Int. Cl.³ .............................................. G01C 22/00
[52] U.S. Cl. ................................ 235/95 R; 235/132 E
[58] Field of Search ............ 235/95 R, 96, 97, 132 R, 235/132 A, 132 E, 117 R; 73/490

[56] References Cited

U.S. PATENT DOCUMENTS 3,856,195 12/1974 Kakizaki et al. ................. 235/132 E

FOREIGN PATENT DOCUMENTS 474008 5/1951 Canada .

*Primary Examiner*—L. T. Hix
*Assistant Examiner*—Thomas H. Tarcza
*Attorney, Agent, or Firm*—Augustus G. Douvas

[57] ABSTRACT

A mileage counter for vehicles that provides signals after predetermined mileage intervals indicating the need for vehicle maintenance. Several different maintenance requirements are signalled at different intervals and after the maintenance on the vehicle has been performed each of the counting functions may be reset independently.

The counter consists of a plurality of ascending order counter wheels driven by the vehicle's speedometer drive. Several ratchet wheel and switch counting assemblies are mounted adjacent and driven by the higher order one of the counter wheels. One of these counting assemblies may, for example, provide a signal indicating the need for maintenance after a five thousand mile interval, and another signal after fifty thousand miles. Each of these counting assemblies includes an advancing pawl for the ratchet wheel that moves laterally to reset the wheel after the maintenance has been performed, and a holding pawl that also defines one of the contacts of the switch. Each of the counting assemblies stops advancing indefinitely after its predetermined mileage interval without adversely affecting the operation of the remaining portions of the counter.

19 Claims, 12 Drawing Figures

RESETTABLE MILEAGE COUNTING MECHANISM

BACKGROUND OF THE PRESENT INVENTION

Because of the numerous emission control components in today's vehicles, along with their projected increase over the next decade, it has been found necessary to effect government regulations requiring a visual indication, e.g., lights on the dashboard of the vehicle, to indicate the need to perform each important servicing requirement for these components. Since different emission control components have different servicing requirements, it is necessary to provide these signals at different mileage intervals, for example one component might require maintenance every five thousand miles, while another component may require maintenance only at fifty thousand mile intervals. It is also desirable that the individual indicating systems be resettable so that after the maintenance has been performed on the vehicle, the indicating system will again begin counting vehicle travel for the second maintenance event.

With this background it has been found advantageous to employ a counting mechanism, similar to that provided in conventional vehicle odometers to actuate various types of switch mechanisms. However, known designs employing these combined odometers and switches have thus far not been found completely acceptable because of limitations on the mileage intervals, the inability to reset each interval function independently of the others, and the extreme complexity of the units making them difficult and expensive to manufacture.

It is the primary object of the present invention to ameliorate the problems noted above in counting mechanisms that provide one or more signals after the predetermined mileage intervals to indicate the need for maintenance.

SUMMARY OF THE PRESENT INVENTION

In accordance with the present invention, a vehicle maintenance odometer is provided that after predetermined mileage intervals closes switches indicating the need for maintenance, in which each of the switches is resettable independently of one another. After a predetermined number of miles have been driven by the vehicle, each of the switches closes and provides a signal to a suitable indicator that designates the need to the vehicle operator for maintenance service, such as for emission control parts replacement, adjustment or cleaning.

Toward this end, the present resettable counter consists of several ratchet wheel and switch counting assemblies driven by the higher order one of a plurality of odometer type counter wheels mounted in side by side fashion along a single axis. Each of the counting assemblies is driven by the higher order one of the odometer wheels in step by step fashion by a cam that reciprocates an indexing pawl into engagement with the ratchet wheel to rotate it incrementally for each full revolution of the higher order wheel of the counter. This achieves the necessary gear reduction so that each of the counting assemblies counts intervals from one thousand to almost one hundred thousand miles, depending upon the number of teeth on the ratchet wheels and the stroke length of the indexing pawls.

Each of the ratchet wheels is freely rotatable on a main odometer shaft and as the advancing pawl shifts the ratchet wheel in step by step fashion, a holding pawl biased by one of the spring contacts of a spring switch maintains the rotated or advanced position of the ratchet wheel. The other switch contact is also a spring that biases the ratchet or indexing pawl into engagement with the ratchet wheel. There is an interruption in the gear teeth on the ratchet wheel angularly positioned so that on a predetermined angular rotation of the ratchet wheel, the holding pawl will leave the ratchet teeth and fall into the interruption closing its contact with the indexing pawl spring contact, thereby providing a signal indicating the need for maintenance.

To reset each of the ratchet wheel and switch mechanisms, the ratchet pawl is mounted for lateral as well as pivotal movement. By shifting the ratchet pawl laterally by a suitable tool against the bias of the switch spring contacts, the ratchet pawl and holding pawl are moved out of engagement with the ratchet wheel freeing the ratchet wheel for return movement under the influence of a torsion spring which continuously biases the ratchet wheel in a return direction. After the ratchet wheel returns to its starting position, the ratchet pawl is released and its contact spring urges it back into engagement with the ratchet wheel gear teeth and another counting interval begins. With this mechanism, each of the ratchet wheel and switch assemblies is reset independently of one another and also independently of the counter wheels.

A further feature of the present invention is that after each of the ratchet wheel and switch assemblies has been actuated after its own predetermined mileage interval, the ratchet wheel will not be advanced further and will therefore not continue to count mileage, without any adverse effect on the other ratchet wheel and switch mechanisms. This is achieved by permitting both the holding pawl and the ratchet pawl to drop into the toothless interruption in the ratchet wheel after switch actuation so that the continued oscillation of the ratchet pawl by its cam merely causes the ratchet pawl to oscillate out of engagement with any ratchet wheel teeth.

DETAILED DESCRIPTION OF THE PREFERRED EMBODIMENT

Figure 1:
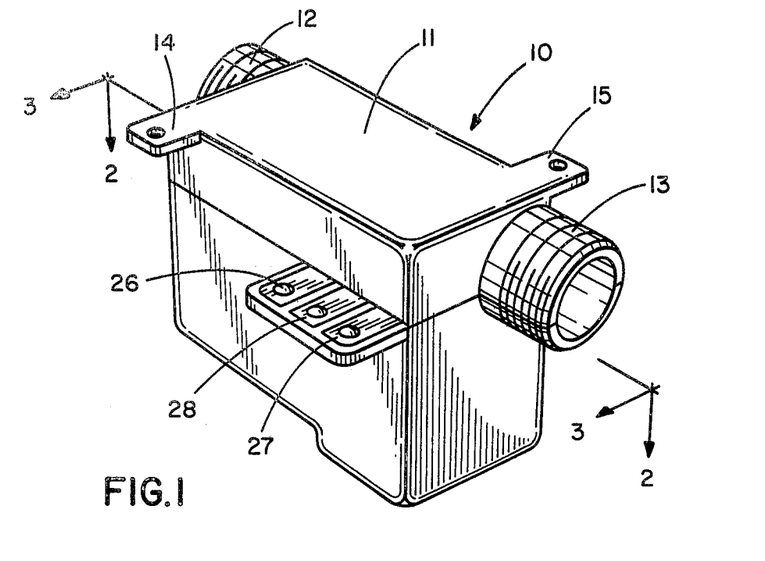
FIG. 1 is a prespective view of the present maintenance odometer.
Figures 2, 4:
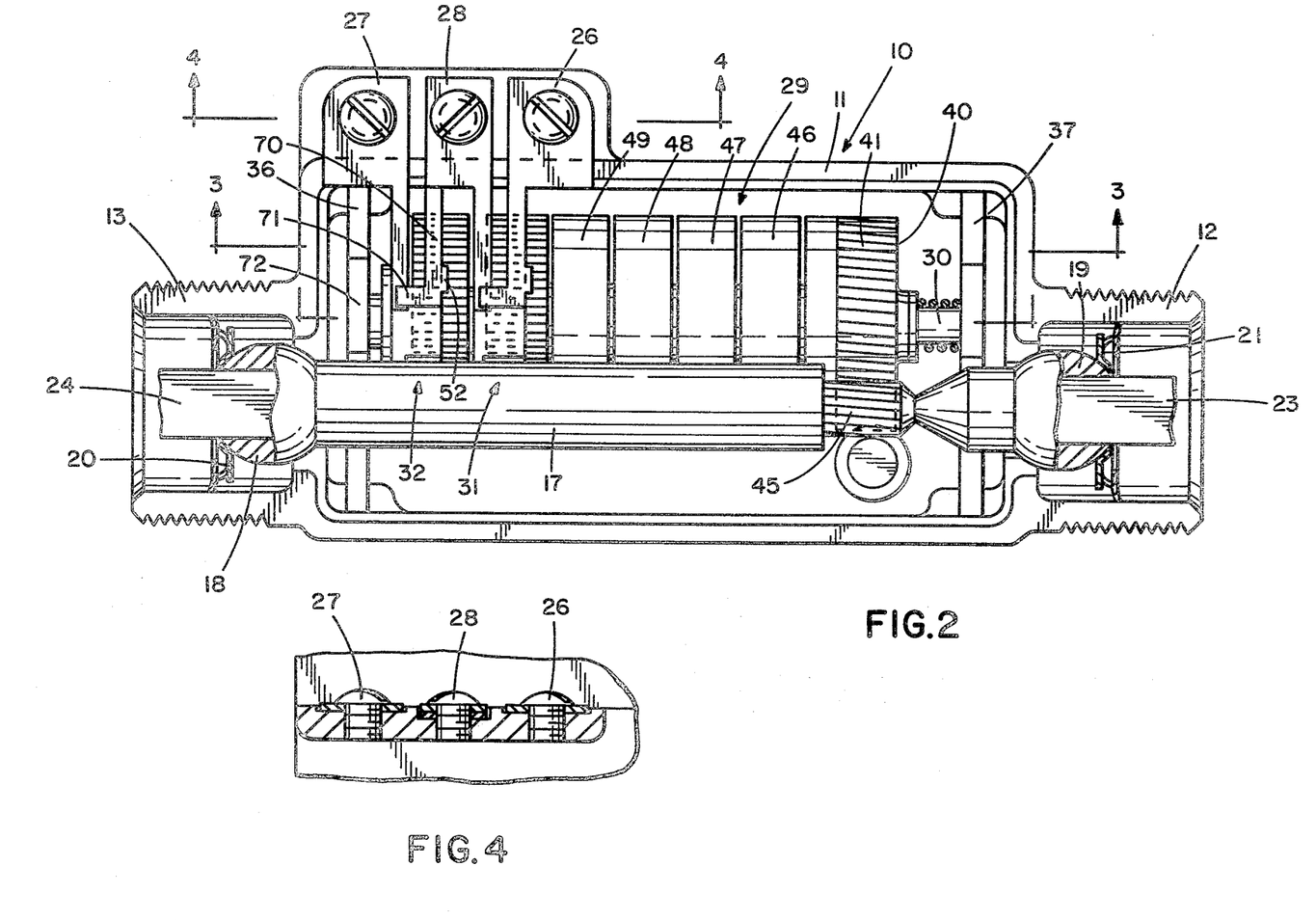
FIG. 2 is an enlarged cross-section taken generally along line 2—2 of FIG. 1 showing the main odometer input shaft.
FIG. 4 is a fragmentary section taken generally along line 4—4 of FIG. 2 showing the switch terminals.
Figure 3:
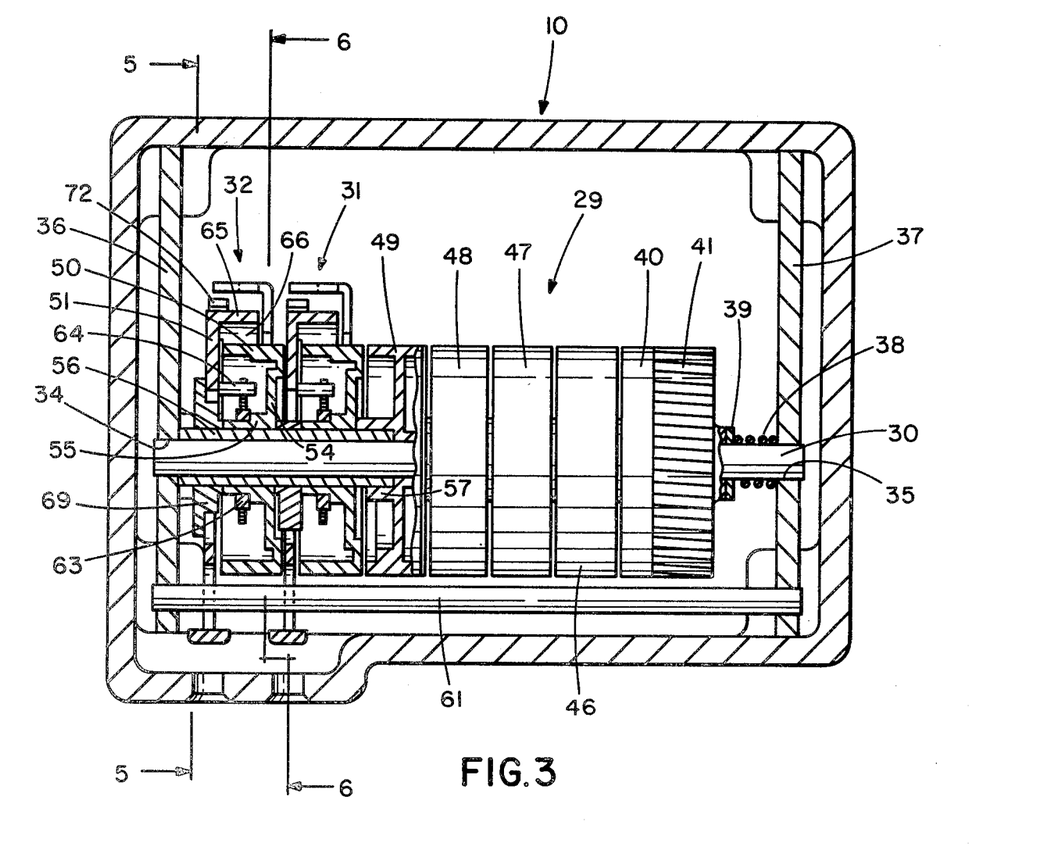
FIG. 3 is a partly fragmentary cross-section taken generally along line 3—3 of FIG. 2 showing the counter wheels and ratchet wheel and switch assemblies.

Referring to the drawings and particularly FIGS. 1 to 3, the present resettable maintenance odometer 10 is seen to include a rectangular housing 11 having an input fitting 12 and an output fitting 13 with projections 14 and 15 extending from the upper surface of the housing permitting the housing to be mounted under the vehicle dashboard, or in the engine compartment against the fire-wall.

A main input shaft 17 extends through the housing 11 and has spherical end portions 18 and 19 that are biased in opposite directions by spring retainers 20 and 21 that serve to position shaft 17 within the housing both radially and axially. Spherical portion 19 receives a driving tip 23 of the vehicle's flexible speedometer-odometer shaft connected in conventional fashion to the vehicle transmission. Spherical portion 18 receives drive tip 24 of another section of flexible shafting connected at its other end to drive the vehicle speedometer and odometer in conventional fashion.

Thus connected, the reset odometer 10 provides a signal at terminal 26 after a first predetermined number of miles and a second signal at terminal 27 after a different predetermined number of miles, each indicating the need for servicing individual vehicle components, such as components in the emission control system. Terminal 28 is the positive or ignition terminal.

As seen in FIGS. 2 and 3, the maintenance odometer 10 includes a plurality of ascending order counter wheels 29 mounted for rotation on a main shaft 30 and two ratchet wheel and switch counter assemblies 31 and 32. Counter assembly 31 provides a signal at terminal 26 after a predetermined number of miles have been travelled and counter assembly 32 provides a signal at terminal 27 after a different predetermined number of miles.

As seen in FIG. 3, shaft 30 is mounted in apertures 34 and 35 in spaced support members 36 and 37 fixed in housing 11. Shaft 30 and the counter wheels 31 are biased to the proper axial position by spring 38 that reacts between a side wall member 37 and a washer 39.

The counter wheels 31 include an input wheel 40 having teeth 41 interengaging a worm wheel 42 connected to a cross shaft 43 that has an upper worm gear 44 engaged with a worm gear 45 on input shaft 17 as seen in FIG. 2. In this manner wheel 40 rotates continuously with the input shaft 17. Input wheel 40 drivingly engages a 1/10 wheel 46 in step-by-step fashion through suitable conventional transfer gearing. Similarly wheel 46 drives a "ones" wheel 47, the "ones" wheel drives a "tens" wheel 48, and the "tens" wheel 48 drives a "hundreds" wheel 49 through suitable transfer gearing well known in the art. In this manner the "hundreds" wheel 49 advances one complete revolution for every one thousand miles driven. It should be understood, however, that an additional counting wheel, such as a "thousands" wheel could be interposed between the wheel 49 and the ratchet wheel and switch assemblies 31 and 32 to provide a further gear reduction. Thus, the counting wheels 29 provide the necessary gear reduction between the continuously rotating input shaft 49 and the ratchet wheel and switch assemblies 31 and 32.

Each of the ratchet wheel and switch counting assemblies 31 and 32 are mechanically the same, although they are modified to provide output signals after different but predetermined mileage intervals. For this reason the following description will be confined to the ratchet wheel and switch counting assembly 32 with the understanding that counting assembly 31 is identical thereto except modified with different reduction ratios.

Figure 5:
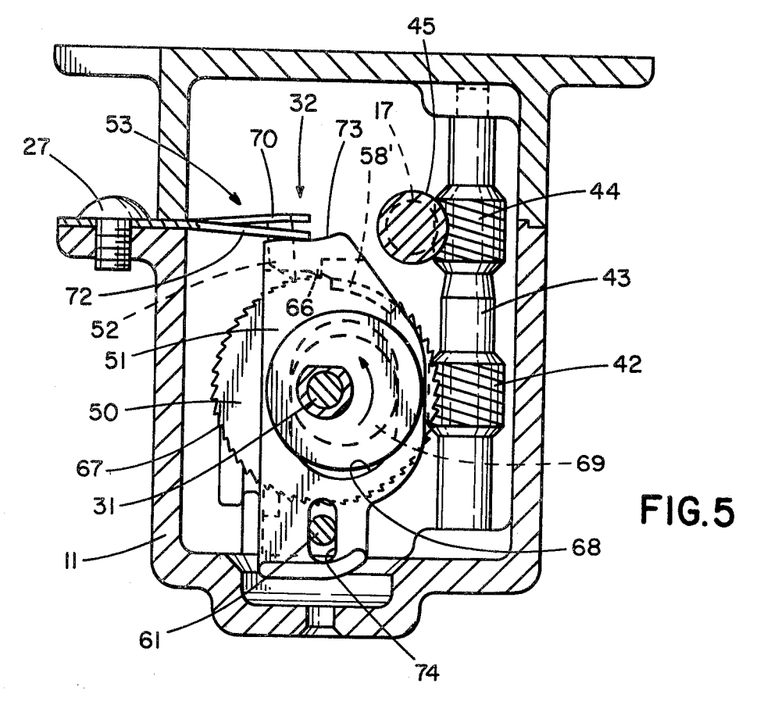
FIG. 5 is a cross-section taken generally along the line 5—5 of FIG. 3 illustrating one of the ratchet wheel and switch assemblies at the onset of the counting interval.

Referring to FIG. 5, counting assembly 32 is seen to include a toothed ratchet wheel 50 rotatable about the axis of odometer shaft 30, an oscillating advancing ratchet pawl 51 for indexing wheel 50, a holding pawl 52 for maintaining the indexed position of the ratchet wheel 50, and a switch 53 that provides an output from terminal 27 when closed. Switch 53 is shown in its open position in FIG. 5 and its closed position in FIG. 10.

Figure 6:
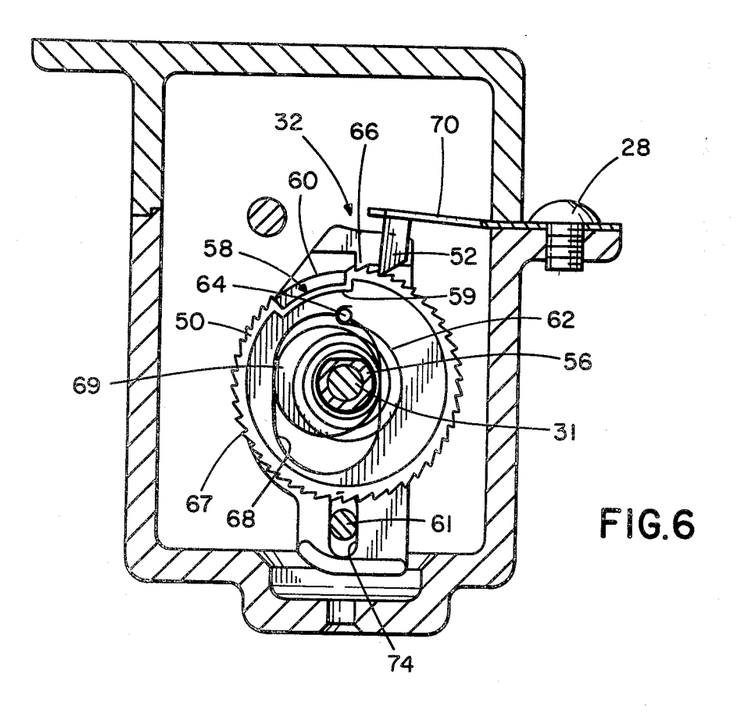
FIG. 6 is a cross-section taken generally along the line 6—6 of FIG. 3 showing the opposite side of the ratchet wheel and switch assembly shown in FIG. 5.

As seen more clearly in FIG. 3, ratchet wheel 50 has a side web 54 and a central cylindrical hub 55 freely rotatable on a ratchet wheel input shaft 56. Wheel 50 is continuously biased in a return direction (clockwise in FIG. 6) by a torsion wire spring 62 fixed at one end to a collar 63 carried by the ratchet wheel hub 55 and at the other end to a rod 64 carried by the ratchet pawl 51. The periphery of the ratchet wheel 50 has one-way teeth 67 interrupted by a recess 58 shown clearly in FIG. 6. Recess 58 is stepped having a deeper portion 59 on one side and a shallower portion 60 on the other. Recess 58 when positioned adjacent the holding pawl 52 causes actuation of switch 53.

Ratchet wheel input shaft 56 is freely rotatable on odometer shaft 30 and is fixed at its right end to central hub 57 of the "hundreds" counter wheel 49. Shaft 56 therefore indexes with the indexing movement of the higher order odometer wheel 49.

The ratchet pawl 51 indexes wheel 50 and it has an elongated slot 74 at one side thereof slidably and pivotally mounting the wheel on rod 61 fixed within the housing 11 in side plates 36 and 37, as seen in FIG. 3. Rod 61 and slot 74 permit the pivotal oscillating movement of pawl 51 while at the same time permit limited translating movement of the pawl during resetting.

The ratchet pawl 51 has an upper integral lateral projection 65 that has a sharp tooth 66 engageable with the teeth 67 on the ratchet wheel 50 for advancing the ratchet wheel. A central opening defining an internal follower surface 68 is formed in pawl 51 engaged by an eccentric cam 69 fixed to input shaft 56.

Figure 11:
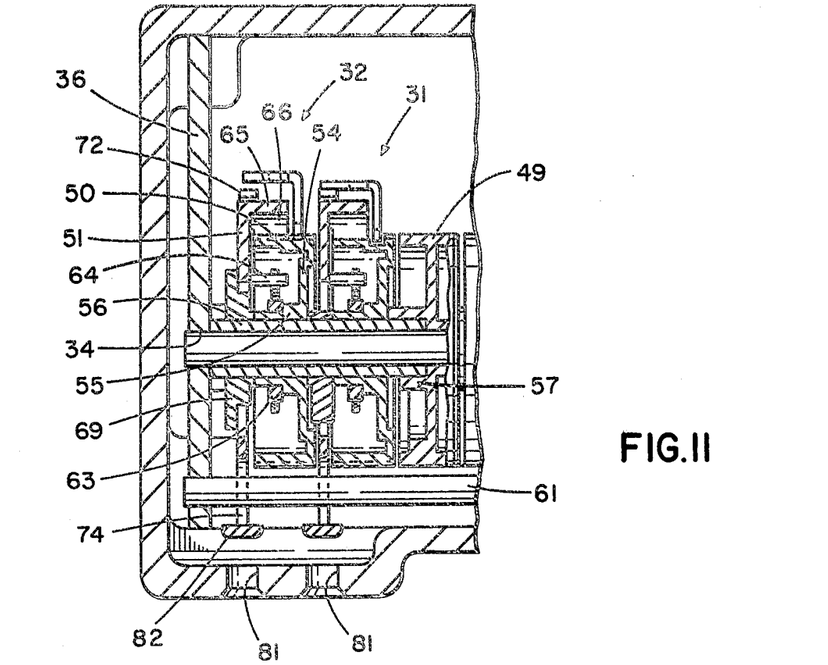
FIG. 11 is a fragmentary section showing the two ratchet wheel and switch assemblies with the right ratchet wheel and switch assembly actuated and the left still advancing.

The switch assembly 53 has a spring contact member 70 fixed in the housing by terminal 28 and carries the holding pawl 52 at its end to continuously bias the holding pawl into engagement with the ratchet wheel teeth 67. The spring contact 70 has a contact projection 71 extending over a second spring contact 72 fixed in the housing by terminal 27 (FIGS. 2 and 11). The spring contact 72 engages top surface 73 of the ratchet pawl 51 continuously biasing the pawl into engagement with the ratchet wheel 50.

Figure 7:
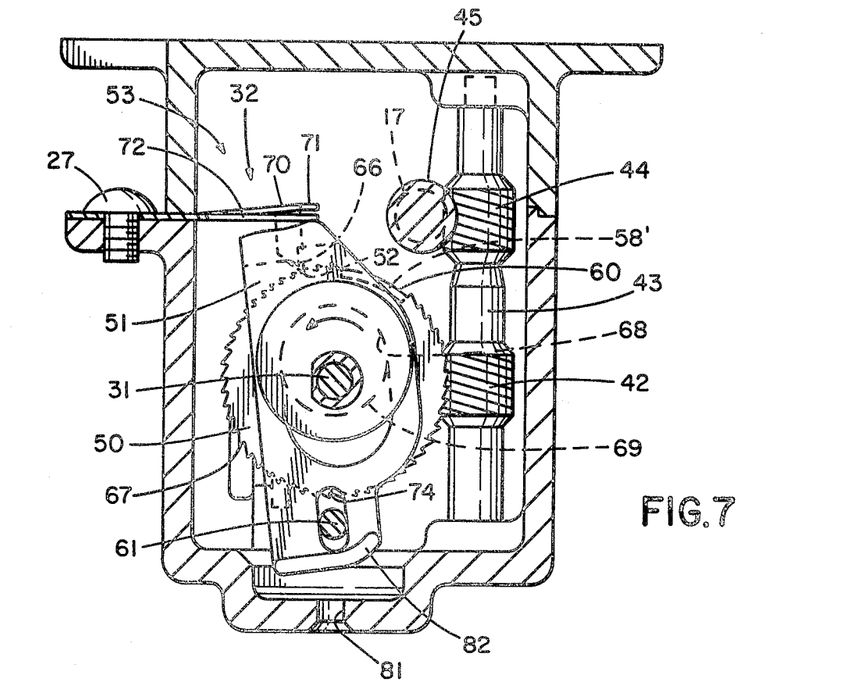
FIG. 7 is a cross-section similar to that shown in FIG. 5 with the ratchet wheel and switch assembly beginning advancement from the position shown in FIG. 5.
Figure 8:
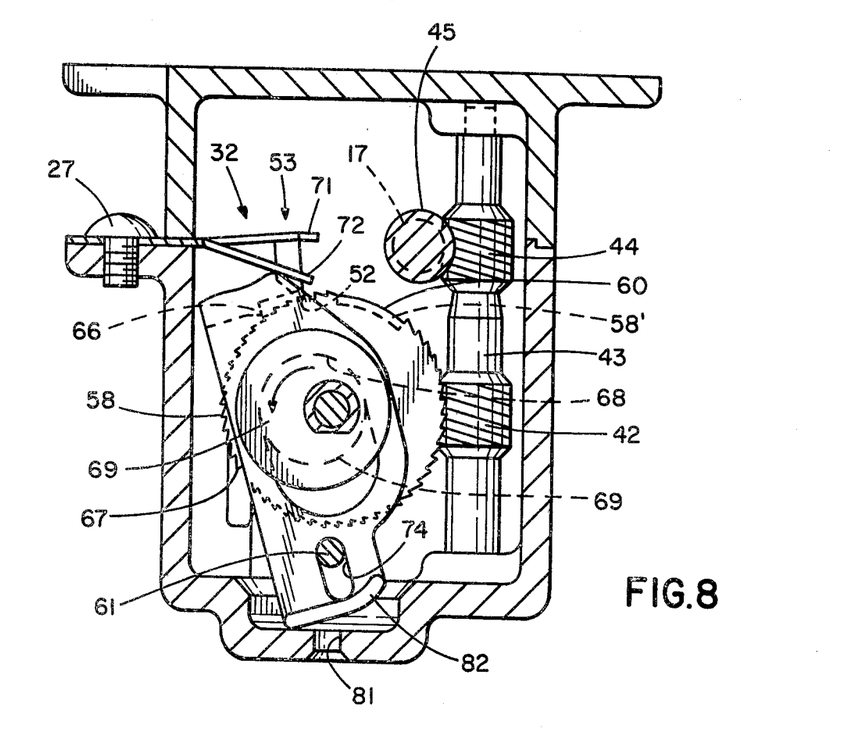
FIG. 8 is a cross-section similar to that shown in FIG. 7 with the ratchet pawl shifting out of engagement with the ratchet wheel.
Figure 9:
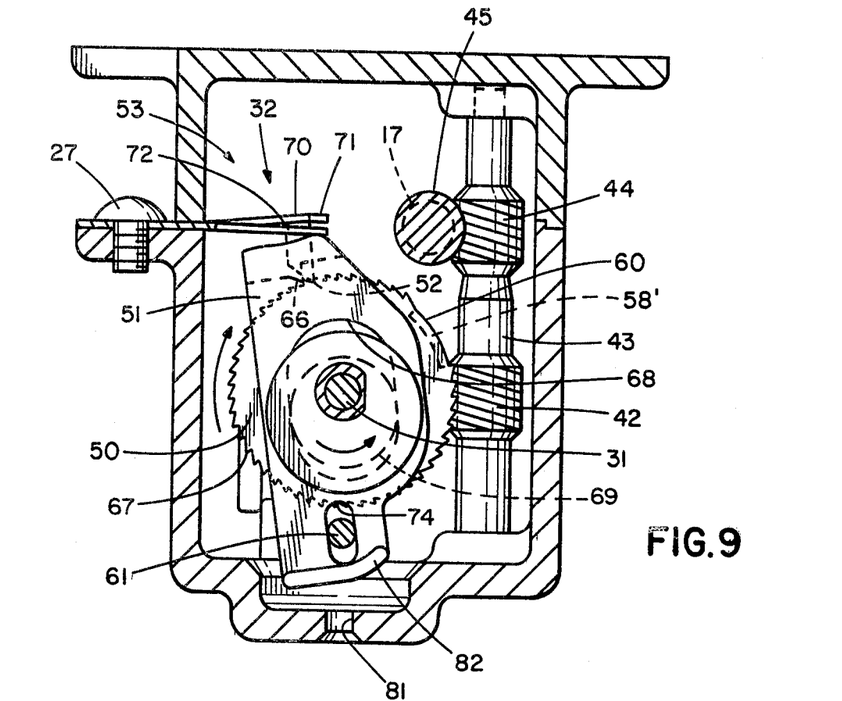
FIG. 9 is a cross-section generally similar to that shown in FIG. 8 with the ratchet pawl advancing the ratchet wheel.

In operation, the counting assembly 32 is shown moving from its initial position in FIG. 5, with cam 69 rotating in a counterclockwise direction driven by the higher order counter wheel 49. Cam 69 indexes 1/10th of a revolution for each revolution of the higher order wheel 49 providing a 10:1 reduction between the higher order wheel 49 and pawl 51. The reduction between pawl 51 and ratchet wheel 50 may be varied as desired depending upon the number of teeth 67 on the ratchet wheel and also the stroke length of the pawl 51. As cam 69 rotates upwardly from its position shown in FIG. 5, ratchet pawl tooth 66 is lifted upwardly away from teeth 67 and the pawl pivots in a counterclockwise direction serially through the positions shown in FIGS. 7 and 8, and as the cam 69 pivots downwardly from its position shown in FIG. 8, ratchet tooth 66 will reengage the ratchet wheel teeth 67. Upon further movement of the cam 69 to its lowermost position shown in FIG. 9, ratchet pawl 51 will begin advancing the ratchet wheel 50 in a clockwise direction.

Figure 10:
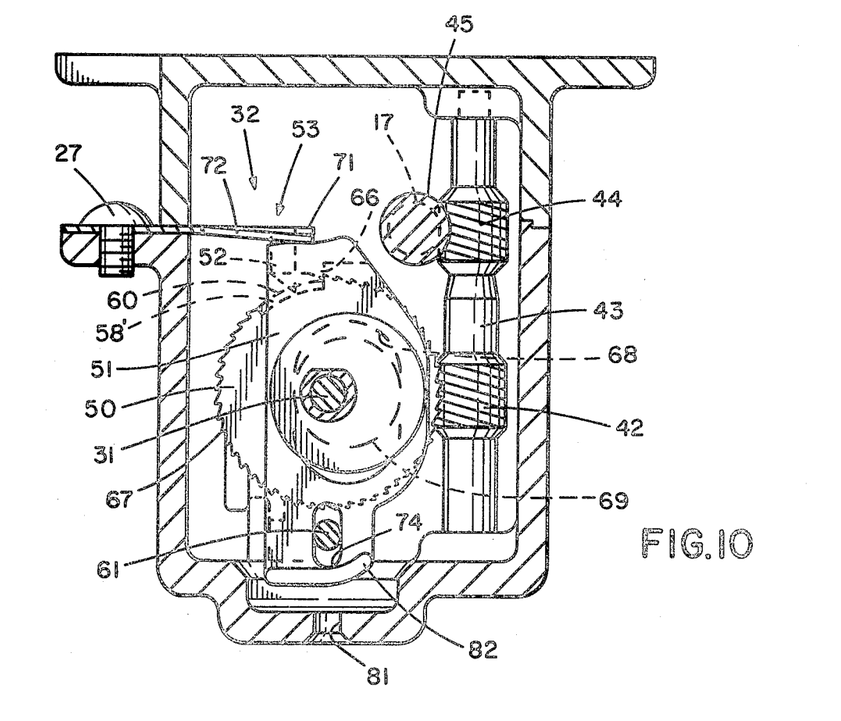
FIG. 10 is a cross-section generally similar to FIG. 9 after the ratchet wheel has advanced to the position of switch actuation where the ratchet and holding pawls fall into a discontinuity on the ratchet wheel.

This step-by-step indexing of the ratchet wheel 50 continues until the recess 58 in the ratchet wheel is indexed into alignment with the ratchet holding pawl 52 as seen in FIG. 10. When this occurs, the holding pawl 52 will fall into the recess 58 permitting contact projection 71 to drop into engagement with the spring contact 72, closing switch 32 and providing a signal at terminal 27. Immediately thereafter, the ratchet pawl 66 oscillates onto toothless surface 60 on the periphery of the ratchet wheel 50 and this surface is of sufficient length so that with the continued oscillating movement of the ratchet pawl, no advancement of the ratchet wheel 50 will occur.

Figure 12:
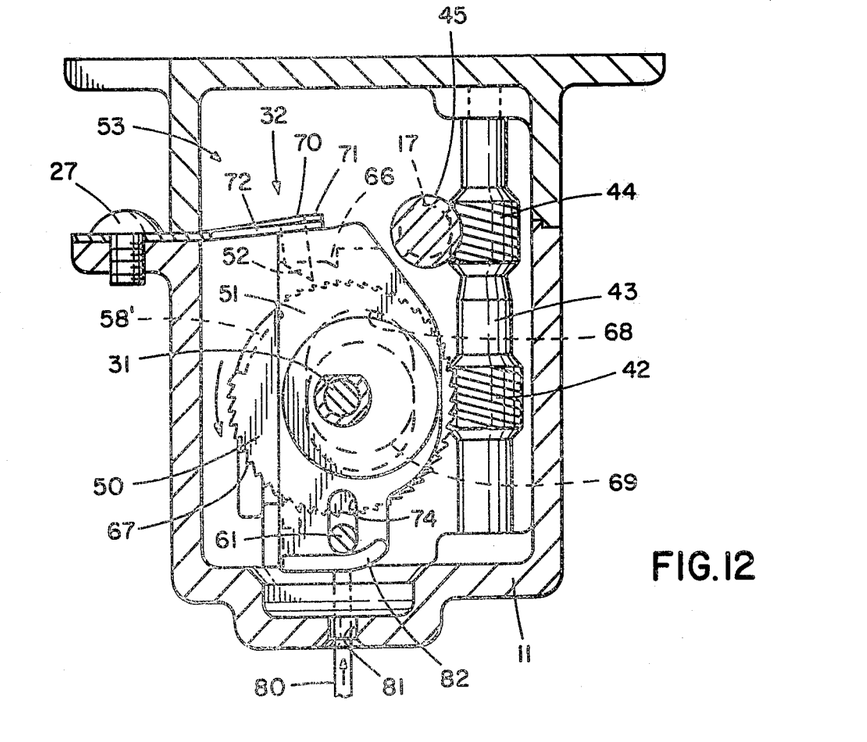
FIG. 12 is a cross-section generally similar to FIG. 10 with the ratchet pawl shifted manually by an inserted tool releasing the advancing pawl and the holding pawl from the ratchet wheel.

As seen in FIG. 12, ratchet wheel and switch mechanism is reset by inserting a simple straight tool 80 through an aperture 81 in the lower portion of housing 11 engaging an integral flange 82 on the lower portion of the ratchet wheel 50 forcing the ratchet wheel 50 upwardly against the biasing force of the spring contacts 70 and 72, moving pawl 51 and holding pawl 52 away from the ratchet wheel 50, permitting the ratchet wheel to rotate counterclockwise as seen in FIG. 12 under the influence of return spring 62 returning the ratchet wheel 50 to its starting position in FIG. 5. The counting assembly 32 then begins counting another predetermined interval.

In this manner each of the ratchet wheel and switch counting assemblies may be independently reset without affecting the count in the other counting assembly or the counter 29. The interval counted by each of these counting assemblies 31 and 32 may be varied by varying the number of teeth on the ratchet wheel 50, the stroke length of the ratchet pawl 51 or the position of the recess 58 on the ratchet wheel.

What is claimed is:

1. A resettable counter and switch assembly for providing signals at predetermined intervals, comprising; an input shaft, a plurality of counter wheels of ascending value drivingly interconnected to one another and driven by the input shaft, a ratchet wheel rotatable about a predetermined axis, a ratchet pawl driven by the counter wheels for advancing the ratchet wheel, switch means providing a signal when the ratchet wheel reaches a predetermined position, and reset means including means for selectively releasing the ratchet pawl from the ratchet wheel to return the ratchet wheel from the predetermined position without resetting the counter wheels.

2. A resettable counter and switch assembly for providing signals at predetermined intervals as defined in claim 1, wherein the ratchet wheel is rotatable about the same axis and adjacent the counter wheels, said ratchet pawl being driven by the higher order one of the counter wheels.

3. A resettable counter and switch assembly for providing signals at predetermined intervals as defined in claim 1, including a cam driven by the higher order one of the counter wheels, said cam drivingly engaging the ratchet pawl to reciprocate the pawl as the higher order wheel rotates.

4. A resettable counter and switch assembly for providing signals at predetermined intervals as defined in claim 1, wherein said ratchet pawl is mounted for pivotal movement and independent sliding movement in a plane perpendicular to its pivotal axis, means biasing said pawl in one direction, said reset means including a manually operable member on the ratchet pawl.

5. A resettable counter and switch assembly for providing signals at predetermined intervals as defined in claim 1, including a holding pawl engaging said ratchet wheel, said ratchet wheel having an interruption at a predetermined position thereon in alignment with the holding pawl so that the holding pawl moves inwardly when it passes into the interruption, said switch means being responsive to the inward movement of the holding pawl.

6. A resettable counter and switch assembly for providing signals at predetermined intervals as defined in claim 5, wherein the switch means includes a first spring contact continuously biasing the ratchet pawl, and a second spring contact selectively engageable with the first spring contact and biasing the holding pawl.

7. A resettable counter and switch assembly for providing signals at predetermined intervals, comprising; an input shaft, a plurality of ascending order counter wheels driven by the input shaft, a first ratchet wheel mounted for rotation adjacent the higher order one of the counter wheels, a first ratchet pawl for engaging and advancing the first ratchet wheel, said first ratchet pawl being driven by the higher order one of the counter wheels, first switch means responsive to a predetermined angular rotation of the first ratchet wheel, and means for resetting the first ratchet wheel, a second ratchet wheel mounted for rotation adjacent the first ratchet wheel, a second ratchet pawl for engaging and advancing a second ratchet wheel, said second ratchet pawl being driven by said higher order counter wheel, second switch means responsive to a predetermined angular rotation of the second ratchet wheel, and means for resetting the second ratchet wheel independently of the first ratchet wheel.

8. A resettable counter and switch assembly for providing signals at predetermined intervals as defined in claim 7, wherein the means for resetting the first and second ratchet wheels includes spring means continuously biasing the first and second ratchet wheels in a direction opposite their advancing direction, and means to shift the first and second ratchet pawls out of engagement with the first and second ratchet wheels permitting the first and second ratchet wheels to return to an initial position by the spring means.

9. A resettable counter and switch assembly for providing signals at predetermined intervals as defined in claim 8, wherein said first and second ratchet pawls are pivotally mounted on a pivot shaft, said pawls having elongated slots slideably receiving said shaft to permit movement of the pawls laterally to release the pawls from the first and second ratchet wheels for reversing the ratchet wheels and permitting resetting of the ratchet wheels.

10. A resettable counter and switch assembly for providing signals at predetermined intervals as defined in claim 8, wherein said first and second switch means each includes a first spring contact continuously biasing the ratchet pawls and a second spring contact selectively engageable with the first spring contact and biasing the holding pawls.

11. A vehicular odometer for providing a signal indicating the need for vehicle maintenance after a predetermined number of miles travelled by the vehicle, comprising; an input shaft, a plurality of aligned counter wheels arranged in ascending order and driven by the input shaft in rotation about a predetermined axis, a ratchet wheel mounted for rotation about said axis adjacent the higher order one of said counter wheels, a ratchet pawl reciprocably driven by the higher order one of the counter wheels for advancing the ratchet wheel in step-by-step fashion, a holding pawl engageable with the ratchet wheel, switch means for providing a signal indicating the need for vehicle maintenance responsive to a predetermined angular position of the ratchet wheel, and means for resetting the ratchet wheel after maintenance has been performed including spring means continuously biasing the ratchet wheel in a direction opposite the direction of advancement, and means for disengaging the ratchet pawl and the holding pawl from the ratchet wheel permitting the spring means to return the ratchet wheel to a predetermined position.

12. A vehicular odometer for providing a signal indicating the need for vehicle maintenance after a predetermined number of miles travelled by the vehicle as defined in claim 11, wherein the spring means includes a torsion spring engageable with the ratchet wheel, said switch means including a first spring contact continuously biasing the ratchet pawl into engagement with the ratchet wheel, and a second spring contact engageable selectively with the first spring contact and continuously biasing the holding pawl into engagement with the ratchet wheel.

13. A vehicular odometer for providing a signal indicating the need for vehicle maintenance after a predetermined number of miles travelled by the vehicle as defined in claim 12, wherein said means for disengaging the ratchet pawl and the holding pawl from the ratchet wheel includes means mounting the ratchet pawl for lateral movement against the biasing force of the first spring contact, said ratchet pawl being movable laterally a sufficient distance so that the first spring contact moves the second spring contact outwardly and the holding pawl out of engagement with the ratchet wheel.

14. A vehicular odometer for providing a signal indicating the need for vehicle maintenance after a predetermined number of miles travelled by the vehicle, comprising; an input shaft, a plurality of counter wheels of ascending order driven by the input shaft about a single axis, an output shaft driven by the higher order one of the counter wheels, a ratchet wheel mounted for rotation on said output shaft, a pivot shaft mounted beneath the output shaft, a ratchet pawl pivotally mounted on the pivot shaft and engaging the ratchet wheel to advance it in step-by-step fashion, a cam driven by the output shaft, said ratchet pawl having an opening defining a follower surface to pivot the ratchet pawl back and forth as the cam rotates, a spring biased holding pawl engaging the ratchet wheel to maintain the advanced position of the ratchet wheel, a recess on the periphery of the ratchet wheel in axial alignment with the holding pawl so that the holding pawl moves out of holding engagement with the ratchet wheel, and switch means responsive to said movement of the holding pawl.

15. A vehicular odometer for providing a signal indicating the need for vehicle maintenance after a predetermined number of miles travelled by the vehicle as defined in claim 14, wherein said ratchet pawl is transversely movable with respect to the pivot shaft, said ratchet pawl being transversely movable into engagement with the holding pawl to lift it out of engagement with the ratchet wheel during resetting of the ratchet wheel.

16. A vehicular odometer for providing a signal indicating the need for vehicle maintenance after a predetermined number of miles travelled by the vehicle, comprising; an input shaft, a plurality of ascending order counter wheels driven by the input shaft, a ratchet wheel mounted for rotation adjacent the counter wheels, a ratchet pawl driven by the counter wheels engageable with the ratchet wheel, said ratchet wheel having a discontinuous surface permitting movement of the ratchet pawl or holding pawl upon a predetermined angular rotation of the ratchet wheel so that the ratchet wheel ceases rotation even though the counter wheels continue rotating, and switch means responsive to movement of the holding pawl or ratchet pawl.

17. A vehicular odometer for providing a signal indicating the need for vehicle maintenance after a predetermined number of miles travelled by the vehicle, comprising; an input shaft, a plurality of ascending order counter wheels driven by the input shaft, a ratchet wheel driven by the counter wheels mounted for rotation adjacent the counter wheels, pawl means for advancing and holding the ratchet wheel, said ratchet wheel having a discontinuous surface permitting movement of the pawl means upon a predetermined angular rotation of the ratchet wheel to cease rotating the ratchet wheel even though the counter wheels continue rotating, and switch means responsive to said movement of the pawl means.

18. A vehicular odometer for providing a signal indicating the need for vehicle maintenance after a predetermined number of miles travelled by the vehicle, comprising; an input shaft, a plurality of ascending order counter wheels driven by the input shaft, a signal producing wheels driven by the higher order one of the counter wheels, switch means responsive to a predetermined angular position of the signal wheel to provide a signal indicating the need for maintenance, and means for resetting the signal producing wheel without repositioning the counter wheels.

19. A vehicular odometer for providing a signal indicating the need for vehicle maintenance after a predetermined number of miles travelled by the vehicle, comprising; an input shaft, a plurality of ascending order counter wheels driven by the input shaft, a signal producing wheel driven by the higher order one of the counter wheels, switch means responsive to a predetermined angular position of the signal wheel to provide a signal indicating the need for maintenance, a second signal producing wheel driven by the higher order one of the counter wheels, second switch means responsive to a predetermined angular position of the second signal wheel to provide a second signal indicating the need for maintenance, and means for independently and separately resetting each of the first and second signal producing wheels.

* * * * *